(12) United States Patent
Wu et al.

(10) Patent No.: US 12,514,658 B2
(45) Date of Patent: Jan. 6, 2026

(54) ORTHOPEDIC SURGICAL ROBOT SYSTEM

(71) Applicant: KUANRUI INTELLIGENT TECHNOLOGY (SUZHOU) CO., LTD, Jiangsu (CN)

(72) Inventors: Qiong Wu, Jiangsu (CN); Yue Zhang, Jiangsu (CN); Yinxi Lu, Jiangsu (CN); Qiang Gao, Jiangsu (CN)

(73) Assignee: KUANRUI INTELLIGENT TECHNOLOGY (SUZHOU) CO., LTD, Jiangsu (CN)

( * ) Notice: Subject to any disclaimer, the term of this patent is extended or adjusted under 35 U.S.C. 154(b) by 219 days.

(21) Appl. No.: 18/263,350

(22) PCT Filed: Jan. 17, 2022

(86) PCT No.: PCT/CN2022/072312
§ 371 (c)(1),
(2) Date: Jul. 28, 2023

(87) PCT Pub. No.: WO2022/161198
PCT Pub. Date: Aug. 4, 2022

(65) Prior Publication Data
US 2024/0074824 A1    Mar. 7, 2024

(30) Foreign Application Priority Data
Jan. 29, 2021 (CN) .......................... 202110125751.6

(51) Int. Cl.
   *A61B 34/30*     (2016.01)
   *A61B 17/14*     (2006.01)
   *B25J 9/16*      (2006.01)

(52) U.S. Cl.
CPC ............ *A61B 34/30* (2016.02); *A61B 17/142* (2016.11); *B25J 9/1653* (2013.01); *B25J 9/1679* (2013.01)

(58) Field of Classification Search
CPC ....... A61B 34/30; A61B 17/142; A61B 17/14; A61B 34/70; B25J 9/1653; B25J 9/1679
See application file for complete search history.

(56) References Cited

U.S. PATENT DOCUMENTS

| | | | | |
|---|---|---|---|---|
| 2007/0270685 | A1* | 11/2007 | Kang | A61B 90/03 600/424 |
| 2009/0005886 | A1* | 1/2009 | Gao | G05B 13/02 700/29 |
| 2020/0375611 | A1* | 12/2020 | Bleunven | A61B 17/157 |

FOREIGN PATENT DOCUMENTS

| | | |
|---|---|---|
| CN | 103536364 A | 1/2014 |
| CN | 108210070 A | 6/2018 |

(Continued)

OTHER PUBLICATIONS

International Search Report for PCT/CN2022/072312, mailed on Apr. 13, 2022.

(Continued)

*Primary Examiner* — Dylan M Katz
(74) *Attorney, Agent, or Firm* — Junhe Law Office P.C.; James J. Zhu (57) ABSTRACT

An orthopedic surgical robot system; the orthopedic surgical robot system comprises: a robotic arm (10), a distal end (170) of the robotic arm (10) being used for providing a locked working point (O) for the orthopedic surgical robot system; a multi-link mechanism (20), wherein the multi-link mechanism (20) comprises: a first link (210), the first link (210) being coupled to the distal end (170) of the robotic arm (10); and a second link (220), a proximal end of the second link (220) being connected to the first link (210) in a movable manner, so that the movement of the second link (220) relative to the first link (210) provides the orthopedic surgical robot system with a locked working plane relative to the locked working point (O); a bone saw (30), the bone (Continued)

saw being coupled to the distal end of the second link (220) and operable in the locked working plane; and a control system (40), the control system (40) being coupled to the robotic arm (10), and controlling, on the basis of a basic control amount of the robotic arm (10) and the position of an actual working point (O) of the distal end (170) of the robotic arm (10), the distal end (170) of the robotic arm (10) to be stable at the locked working point (O).

8 Claims, 7 Drawing Sheets

(56) References Cited

FOREIGN PATENT DOCUMENTS

| CN | 109259865 A | 1/2019 |
|---|---|---|
| CN | 109925020 A | 6/2019 |
| CN | 111345894 A | 6/2020 |
| CN | 112773507 A | 5/2021 |
| WO | 2021003275 A1 | 1/2021 |

OTHER PUBLICATIONS

Han Jingqing, "Nonlinear PID Controller", Acta Automatic Sinica, Jul. 1994, vol. 20, No. 4, pp. 487-490.

Han Jingqing, "A New Type of Controller—NLPID", Control and Decision, Nov. 1994, vol. 9, No. 6, pp. 401-407.

Han Jingqing, "Nonlinear State Error Feedback Control Law—NLSEF*", Control and Decision, May 1995, vol. 10, No. 3, pp. 221-225.

Han Jingqing, "From PID Technology to "Active Disturbance Rejection Control" Technology", Control Engineering of China, May 2002, vol. 9, No. 3, pp. 13-18.

Ma Youjie et al. "Analysis of the Principle of Active Disturbance Rejection Controller", Journal of Tianjin University of Technology, Aug. 2008, vol. 24, No. 4, pp. 27-30.

\* cited by examiner

ORTHOPEDIC SURGICAL ROBOT SYSTEM

TECHNICAL FIELD

The present application relates to the technical field of medical devices, and more specifically, to an orthopedic surgical robotic system.

BACKGROUND OF THE INVENTION

In orthopedic clinics, surgical robots have been extensively used in processes such as osteotomies and grinding. Typically, a surgical robot for orthopedics is formed by mounting a bone saw to an end of a robot, and the bone saw is driven by the end of the robot to perform operations such as osteotomies. However, since the bone saw needs to be powered by the robot to operate, the robot must have a high output torque and output power. However, robots with high output torque and high output power are large in size and are not suitable for deployment in complex environments and emergency scenarios.

Therefore, there is a need for a portable and easily deployable orthopedic surgical robotic system.

SUMMARY OF THE INVENTION

An objective of the present application is to provide a portable, easily deployable orthopedic surgical robotic system.

According to some aspects of the present application, an orthopedic surgical robotic system is provided. The orthopedic surgical robotic system includes: a robotic arm, wherein a distal end of the robotic arm is used for providing a locked working point for the orthopedic surgical robotic system; a multi-link mechanism, wherein the multi-link mechanism includes: a first link coupled to the distal end of the robotic arm; and a second link, wherein a proximal end of the second link is movably connected to the first link such that a movement of the second link relative to the first link provides the orthopedic surgical robotic system with a locked working plane relative to the locked working point; a bone saw, wherein the bone saw is coupled to a distal end of the second link and is capable of operating in the locked working plane; and a control system, wherein the control system is coupled to the robotic arm and controls the distal end of the robotic arm to stabilize at the locked working point based on a base control variable of the robotic arm and an actual working point position of the distal end of the robotic arm.

According to some other aspects of the present application, a method for controlling the aforementioned orthopedic surgical robotic system is provided. The method includes: controlling the distal end of the robotic arm to be located at an expected working point position based on a base control variable; monitoring an actual working point position of the distal end of the robotic arm; generating a regulation control variable based on a difference between the expected working point position and the actual working point position of the distal end of the robotic arm; and controlling the distal end of the robotic arm to stabilize at the expected working point position based on the base control variable and the regulation control variable.

The above is an overview of the application, and may be simplified, summarized and omitted in detail. Therefore, those skilled in the art should realize that this part is only illustrative, and is not intended to limit the scope of the application in any way. This summary section is neither intended to determine the key features or essential features of the claimed subject matter, nor is it intended to be used as an auxiliary means to determine the scope of the claimed subject matter.

BRIEF DESCRIPTION OF DRAWINGS

Through the following detailed description in conjunction with the accompanying drawings and the appended claims, those skilled in the art will more fully understand the above and other features of the content of this application. It can be understood that these drawings only depict several exemplary embodiments of the content of the present application, and should not be considered as limiting the scope of the content of the present application. By referring to the drawings, the content of this application will be explained more clearly and in detail.

DETAILED DESCRIPTION OF THE INVENTION

In the following detailed description, reference is made to the drawings constituting a part of the specification. In the drawings, unless the context dictates otherwise, similar symbols usually indicate similar components. The illustrative embodiments described in the detailed description, drawings, and claims are not meant to be limiting. Without departing from the spirit or scope of the subject matter of the present application, other implementation modes can be adopted and other changes can be made. It can be understood that various aspects of the content of the application generally described in the application and illustrated in the drawings can be configured, replaced, combined, and designed with various different configurations, and all of these clearly constitute part of the content of the application.

The present application provides an orthopedic surgical robotic system that can have a small size and therefore fulfill the need for portable applications. The orthopedic surgical robotic system of the present application includes a robotic arm, a multi-link mechanism mounted to a distal end of the robotic arm, and a bone saw mounted to the multi-link mechanism. In some embodiments, the multi-link mechanism may be a two-link mechanism, but it will be appreciated that a multi-link mechanism having a greater number of linkages may also be used in the orthopedic surgical robotic system of the present application. In some embodiments, by mounting the multi-link mechanism at the distal end of the robotic arm, a locked working point provided by the distal end of the robotic arm can be converted to a locked working plane provided by the multi-link mechanism, such that the bone saw can operate in the locked working plane. In addition, the bone saw in the orthopedic surgical robotic system of the present application can be operated manually to handle the operated object or to handle the operated object using a separate power source, so that the robotic arm only needs to provide the locked working point for the orthopedic surgical robotic system and does not need to provide the bone saw with the output torque and the output power, and thus the output torque and the output power of the robotic arm are greatly reduced, enabling the robotic arm to be miniaturized. Thus, the orthopedic surgical robotic system of the present application can improve the portability of the orthopedic surgical robotic system, which is favorable to the deployment of the orthopedic surgical robotic system in complex environments and emergency scenarios.

Figure 1:
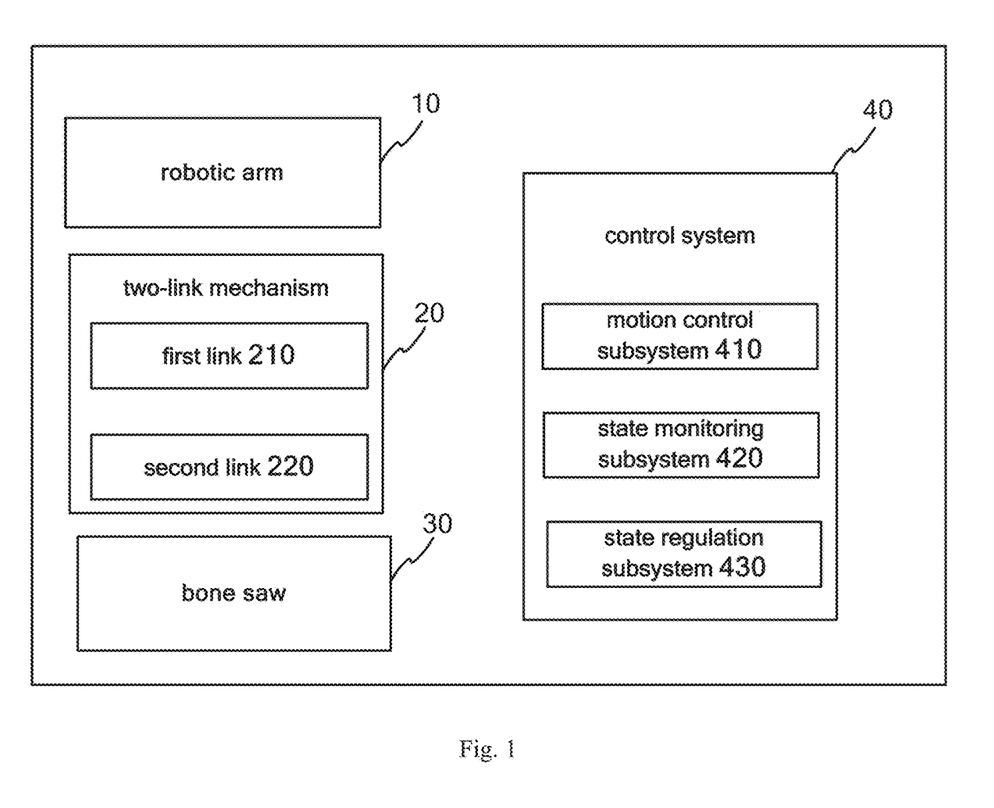
FIG. 1 illustrates a block diagram of an orthopedic surgical robotic system according to an embodiment of the present application.

Referring to FIG. 1, a block diagram of an orthopedic surgical robotic system is illustrated according to an embodiment of the present application. As shown in FIG. 1, the orthopedic surgical robotic system includes a robotic arm 10, a two-link mechanism 20, a bone saw 30, and a control system 40. In the embodiment shown in FIG. 1, the multi-link mechanism is schematically shown as the two-link mechanism 20, but it will be appreciated by a person skilled in the art that the multi-link mechanism is not limited to a two-link mechanism in the present application.

Figure 2:
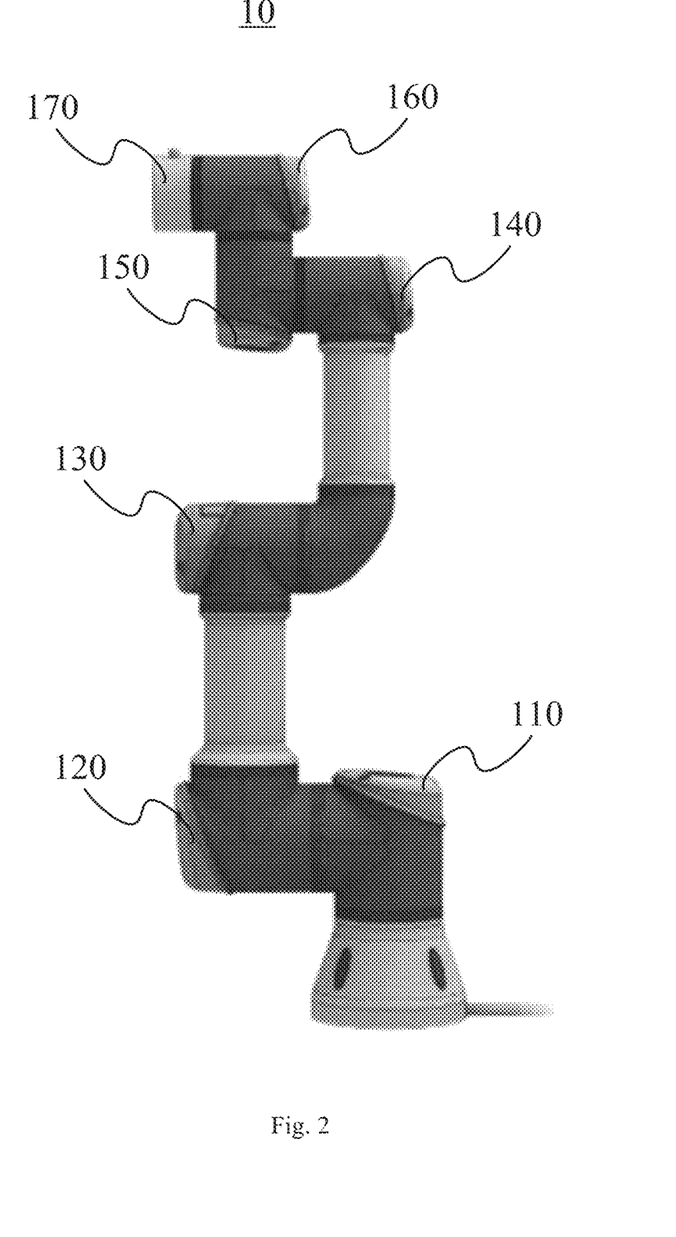
FIG. 2 illustrates a schematic diagram of a six-axis robotic arm according to an embodiment of the present application.

Referring to FIG. 2, a six-axis robotic arm 10 used in an embodiment of the present application is illustrated. The robotic arm 10 has six sequentially coupled joints, and includes a seat portion 110 for realizing a body gyration, a shoulder portion 120 for realizing an upper arm movement, an elbow portion 130 for realizing a lower arm movement, a first wrist portion 140 for realizing a wrist rotational movement, a second wrist portion 150 for realizing a wrist up-and-down movement, and a third wrist portion 160 for realizing a wrist circular movement. The six-axis robotic arm 10, by means of motion trajectory control, can position the distal end 170 of the end joint (i.e., the third wrist portion 160) at a spatial fixation point, which provides a locked working point for the orthopedic surgical robotic system. It should be noted that the terms "distal" or "proximal" as used in this specification are used to describe the location relation of one component and another, wherein "distal" is generally used to describe a direction extending further away from a seat portion of the robotic arm or closer to an operative portion (e.g., a portion used by an orthopedic surgical robotic system for surgery) along a kinematic chain of an movement of the system movement. Similarly, "proximal" is generally used to describe a direction extending closer to the seat portion of the robotic arm or further away from the operating site along the kinematic chain of the movement of the system.

In an example, under control of the control system 40, the six-axis robotic arm 10 of FIG. 2 is capable of providing a repeat positioning accuracy of ±0.03 mm and a hold positioning accuracy of ±0.1 mm with respect to the locked working point. It will be appreciated that in other examples, the repeat positioning accuracy and the hold positioning accuracy may vary according to the application requirements of the orthopedic surgical robotic system, and the present application is not limited thereto.

In an example, the six-axis robotic arm 10 further includes six motors (not shown), where the six motors correspond to the six joints, respectively and provide output torques to their respective joints. The control system 40 controls the distal end 170 of the robotic arm 10 to be located at the locked working point by controlling the output torques of the six motors. In other examples, the robotic arm 10 further includes a speed reducer and/or a timing pulley coupled to each motor for smoothing, adjusting, and stabilizing the output torque of the motor to the corresponding joint.

It should be noted that the output torque of the motor is usually positively correlated with the size and weight of the motor. Since the orthopedic surgical robotic system of the present application is preferably applied in a portable device scenario, the robotic arm 10 is not required to provide the output torque and output power for the bone saw, and thus the output torque and/or the output power of the six motors may be low. For example, the output torque of the motor corresponding to the seat portion 110 and the shoulder portion 120 is 56 Nm, the output torque of the motor corresponding to the elbow portion 130 is 28 Nm, and the output torque of the motor corresponding to each of the first wrist portion 140, the second wrist portion 150, and the third wrist portion 160 is 12 Nm.

In other embodiments, the orthopedic surgical robotic system may also employ robotic arms with other numbers of axes. Although the flexibility of the robot grows as the number of axes increases, a rather high degree of flexibility is not required in portable applications. Considering both cost-effectiveness and speed of operation, in some embodiments of the present application, three-axis, four-axis, or five-axis robotic arm can also be employed. Of course, in some other embodiments, the orthopedic surgical robotic system may also employ a seven-axis or more-axis robotic arm to provide more degrees of operational freedom.

Figure 3:
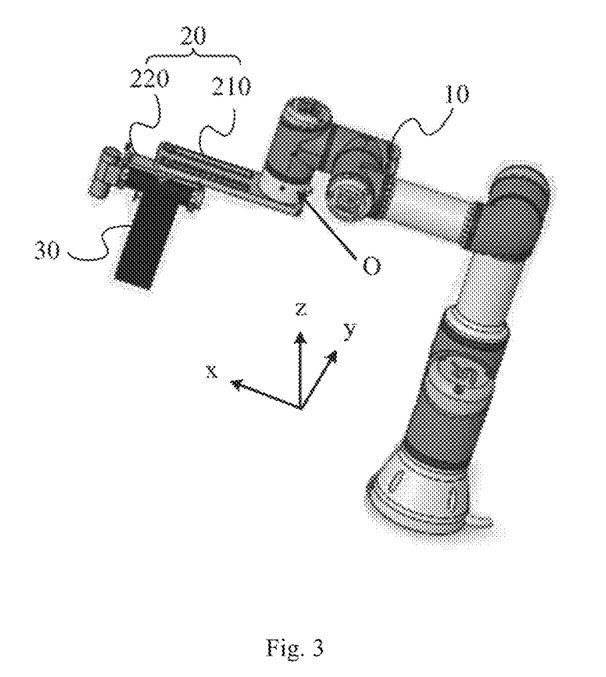
FIG. 3 illustrates a schematic diagram of a two-link mechanism coupled to a robotic arm according to an embodiment of the present application.

Referring to FIG. 3, a schematic diagram of a two-link mechanism 20 coupled to the robotic arm 10 of the orthopedic surgical robotic system is illustrated according to an embodiment of the present application.

As shown in FIG. 3, the two-link mechanism 20 includes a first link 210 and a second link 220. The first link 210 is coupled to a distal end 170 of the robotic arm 10 (see FIG. 2), which is used for providing the orthopedic surgical robotic system with a working point O that can be locked. In one example, a flange is provided on the distal end 170 of the robotic arm 10, and the first link 210 is provided with an aperture that fits with the flange. The first link 210 is fixedly attached to the flange on the robotic arm 10 by a bolt that passes through the aperture of the first link 210. The proximal end of the second link 220 is movably connected to the first link 210. It can be appreciated that the two-link mechanism 20 may be fixedly or movably coupled to the robotic arm 10 by other means.

In the example shown in FIG. 3, the first link 210 is provided with a slider groove, the second link 220 is provided with a slider paired with the slider groove, and the second link 220 is movably connected to the first link 210 by connecting the slider on the second link 220 to the slider groove of the first link 210.

When the slider on the second link 220 is mounted into the slider groove of the first link 210, the movement of the second link 220 with respect to the first link 210 provides the orthopedic surgical robotic system with a locked working plane (x-y plane) with respect to the locked working point O, wherein the shape of the slider groove in the first link 210 determines the manner of the movement of the second link 220 within this locked working plane. Referring to FIG. 3, as an example, the first link 210 is provided with two slider slots along the x-axis direction, such that sliding of the slider of the second link 220 relative to the slider groove of the first link 210 may provide the bone saw 30 with a one-dimensional degree of freedom of movement along the x-axis direction in the locked working plan (x-y plane), wherein the bone saw 30 is mounted to the distal end 170 of the second link 220. In some examples, the bone saw 30 may be an artificial bone saw that may be operated by a physician to slide along the slider groove of the first link 210 to perform osteotomies within the locked working plane. In other examples, the bone saw 30 may also be a motorized bone saw. The motorized bone saw is typically provided with a saw blade, a mechanical reciprocating drive device, and a motor. In use, the motor drives the mechanical reciprocating drive device, and the reciprocating drive device in turn drives the saw blade in a reciprocating motion to perform the osteotomy operation.

In the embodiment shown in FIG. 3, by installing the two-link mechanism 20 at the distal end of the robotic arm 10, the robotic arm 10 only needs to provide the orthopedic surgical robotic system with the locked working point O, and then the locked working point O is converted into a locking of a plane (the x-y plane) by the two-link mechanism 20, such that the operating surgeon can be provided with a locked reference plane for osteotomy. Since the bone saw can perform osteotomies in this locked plane without the need for the robotic arm 10 to provide an output torque and an output power for the bone saw, the entire orthopedic surgical robotic system can be miniaturized.

Figure 4:
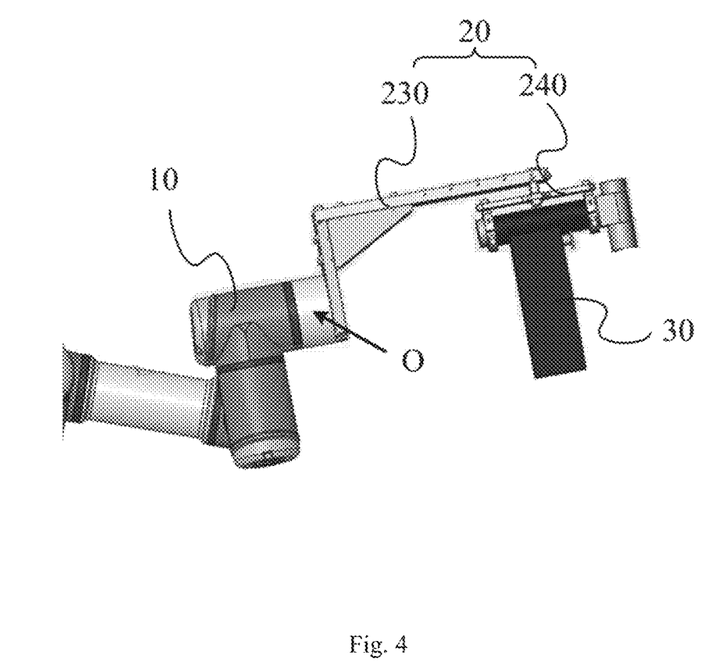
FIG. 4 illustrates a schematic diagram of a two-link mechanism coupled to a robotic arm according to another embodiment of the present application

Referring to FIG. 4, a schematic diagram of a two-link mechanism 20 coupled to the robotic arm 10 of the orthopedic surgical robotic system is illustrated according to another embodiment of the present application. Different from the planar slide two-link mechanism of FIG. 3, the two-link mechanism 20 of FIG. 4 is a right-angle slide two-link mechanism including a first link 230 having a right-angle configuration and a second link 240 movably coupled to the first link 230. Similarly, the two-link mechanism 20 of FIG. 4 can convert the locked working point O provided by the robotic arm 10 into a locked working plane, such that a bone saw 30 mounted at the distal end of the second link 240 is able to move within the locked working plane. The two-link mechanism of FIG. 4 has specific connections and operating charactetistics similar to those of the two-link mechanism of FIG. 3, which will not be repeated herein. It should be noted that neither of the bone saws 30 of FIGS. 3 and 4 shows a saw blade mounted thereon.

Although the multi-link mechanism used in the orthopedic surgical robotic system of the present application is illustrated with the planar slide two-link mechanism and the right-angle slide two-link mechanism in FIGS. 3 and 4, the person skilled in the art should understand that other types of multi-link mechanisms capable of converting point locking to planar locking are also applicable to the orthopedic surgical robotic system of the present application, such as crank two-link or multi-link mechanism, rotating two-link or multi-link mechanism, etc., and can be selected according to the specific application scenarios and needs.

Returning to FIG. 1, the orthopedic surgical robotic system of the present application further includes a control system 40 coupled to the robotic arm 10 and controlling the distal end 170 of the robotic arm 10 to stabilize the distal end 170 of the robotic arm 10 at the locked working point based on a base control variable of the robotic arm 10 and an actual working point position of the distal end 170 of the robotic arm 10.

In an example, the control system 40 includes a motion control subsystem 410, a state monitoring subsystem 420, and a state regulation subsystem 430. Therein, the motion control subsystem 410 is used for controlling the distal end 170 of the robotic arm 10 to be located at an expected working point position based on a base control variable. For example, the base control variable may be output torques of the six motors of the six-axis robotic arm 10, and by controlling the output torque of each motor, a corresponding joint position, i.e., a rotation/offset of a joint, may be controlled, and then the distal end 170 of the robotic arm 10 may be controlled to be located at the expected working point position based on the rotations/offsets of all six joints. In some examples, the expected working point position may be determined based on an operating position (e.g., a position where the orthopedic surgical robotic system is used for surgery).

The state monitoring subsystem 420 is used for monitoring the actual working point position of the distal end 170 of the mechanical arm 10. It should be noted that during the operation of the bone saw 30, the vibration of the bone saw 30 will be transmitted to the robotic arm 10, resulting in an external disturbance to the robotic arm 10. In addition, there is also an internal disturbance in the control system of the robotic arm 10, and the external disturbance and the internal disturbance will result in the vibration of the robotic arm 10, which tends to make the actual working point position of the distal end 170 of the robotic arm 10 deviate from the expected working point position. The state regulation subsystem 430 is used to eliminate the deviation of the actual working point position. Specifically, the state regulation subsystem 430 generates a regulation control variable based on a difference between the expected working point position and the actual working point position of the distal end 170 of the robotic arm 10, and transmits the regulation control variable to the motion control subsystem 410, so that the motion control subsystem 410 is capable of controlling the distal end 170 of the robotic arm 10 to stabilize at the expected working point position based on the base control variable and the regulation control variable, and thereby the locked working point of the distal end 170 of the robotic arm 10 is the aforementioned expected working point.

The structure and operation of the orthopedic surgical robotic system of the present application are described above. In some embodiments, in order to be suitable for portable applications, a rather small output torque and a rather small output power are usually used for the robotic arm in the system, which causes the orthopedic surgical robotic system to be rather sensitive to disturbances and interferences from the external load, and the robustness is reduced, and this makes the positioning accuracy decrease. Therefore, the design of the control system in the orthopedic surgical robotic system is particularly important, i.e., the control system needs to have a good followability, so that the actual working point position of the distal end of the robotic arm can follow the expected working point position and can resist the influence of sudden changes in external loads to provide a locked working point with a high stability.

In some embodiments, the state regulation subsystem in the control system includes an active disturbance rejection controller (ADRC), which is utilized to perform vibration filtering and vibration suppression on the robotic arm of the orthopedic surgical robotic system. Specifically, the ADRC is a nonlinear controller that mainly includes a tracking differentiator, an extended state observer, and a nonlinear state error feedback control law. The principle of an active disturbance rejection controller is to take the model error, uncertain disturbance, etc. in the system as an extended state, and use the extended observer to realize the estimation and compensation. One of the most important features of the active disturbance rejection control is that it does not depend on the model of the object, and it treats all the uncertainties in the controlled object as unknown disturbances or total disturbances, which are observed and estimated in real time by the extended state observer and compensated by the state error feedback control law. In this way, the active disturbance rejection controller can change a linear or nonlinear system into an integral series type and complete the feedback linearization of the dynamic system when the disturbance occurrence law or information is unknown. The description of the active disturbance rejection controller may refer to the works of Han Jingqing, "Nonlinear PM Controller" (Journal of Automation, 1994, 20(4): 487-490), "A New Type of Controller-NLPID" (Control and Decision, 1994, 9(6): 401-407), "Nonlinear State Error Feedback Control Law—NLSEF" (Control and Decision, 1995, 10(3): 221-225), and "From PID to 'Active Disturbance Rejection Control' Techniques," (Control Engineering, 2002, 9(3): 13-18); and the work from Ma Youjie et al. "Principle Analysis of Active Disturbance Rejection Controller" (Journal of Tianjin Polytechnic University, 2008, 24(4): 27-30). The disclosures of the above literature are incorporated herein by reference in their entirety.

Figure 5:
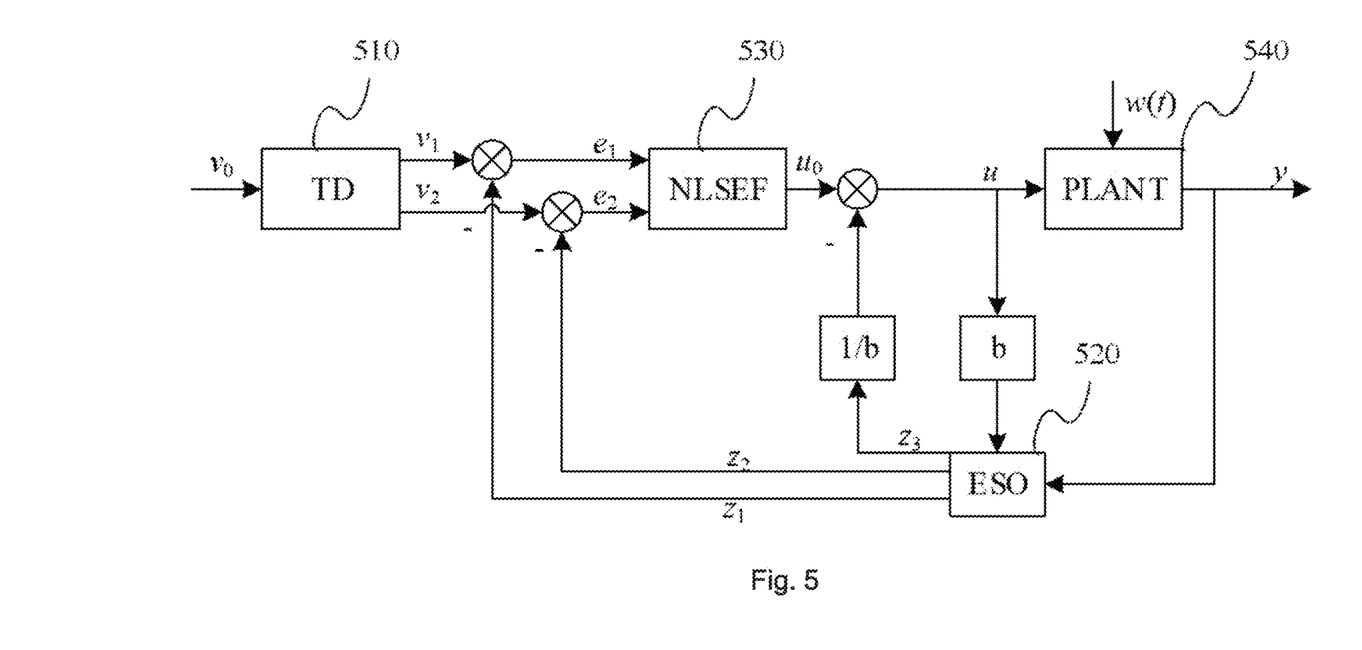
FIG. 5 illustrates a block diagram of a second-order active disturbance rejection controller 50.

Referring to FIG. 5, a structural diagram of a second-order active disturbance rejection controller 50 is illustrated. As shown in FIG. 5, the second-order active disturbance rejection controller 50 includes a tracking differentiator (TD) 510, an extended state observer (ESO) 520, and a nonlinear state error feedback (NLSEF) control law 530 for active disturbance rejection control of a controlled object (PLANT) 540. In applying the active disturbance rejection controller 50 to the state regulation subsystem 430 of FIG. 1, the controlled object 540 may be the robotic arm 10.

In FIG. 5, $v_0$ denotes a reference input signal, and y denotes an actual output signal of the controlled object 540. The active disturbance rejection controller 50 compensates for internal disturbances and uncertain external disturbances w(t) of the controlled object 540 without relying on a model of the controlled object 540, and reduces an error between the actual output signal y of the controlled object 540 and the reference input signal $v_0$. When the active disturbance rejection controller 50 is used to control the robotic arm 10, the reference input signal $v_0$ may be the expected working point position information of the distal end of the robotic arm 10, and the actual output signal y may be the actual working point position information of the distal end of the robotic arm 10.

Specifically, the tracking differentiator 510 receives the reference input signal $v_0$, extracts two signals $v_1$ and $v_2$, $v_1$ tracks $v_0$, and $v_2$ is the differentiation signal for $v_0$. It will be appreciated that if the reference input signal $v_0$ represents positional information (e.g., the expected working point position information of the distal end of the robotic arm 10), then $v_1$ tracks the positional information, and $v_2$ represents information about the first-order change in position over time (i.e., velocity).

The controlled object 540 is assumed to be an uncertain second-order system affected by an unknown disturbance represented by Equation (1):

$$\ddot{y}=f(y,\dot{y},t,w)+bu \quad (1)$$

wherein, y, w and u are all variables related to t, y(t) represents the measurable actual output signal of the controlled object 540 (for example, the actual working point position information of the distal end of the robotic arm 10); $\dot{y}$ and $\ddot{y}$ are the first-order and second-order differentials of y respectively; $f(y, \dot{y}, t, w)$ is a nonlinear function, which represents a generalized disturbance, which includes unknown internal disturbances and external disturbances represented by an unknown function w(t); u(t) is the actual control variable of the controlled object 540; and b is a constant.

The extended state observer 520 observes the state variable of the controlled object 540 based on the actual control variable u(t) and the actual output signal y(t) of the controlled object 540, specifically expressed as the following Equation (2):

$$\begin{cases} \dot{z}_1 = z_2 - g_1(z_1 - y(t)) \\ \dot{z}_2 = z_3 - g_2(z_1 - y(t)) + u(t) \\ \dot{z}_3 = -g_3(z_1 - y(t)) \end{cases} \quad (2)$$

wherein, $z_1$ represents the observation of the actual output signal y(t) of the controlled object 540; $z_2$ represents the observation of the first-order differential $\dot{y}$ of the actual output signal of the controlled object 540; $z_3$ is the expansion observation, which represents the estimated value of the total disturbance of the controlled object 540 (including the internal disturbance of the system and the uncertain external disturbance w(t)); and $g_1$, $g_2$ and $g_3$ are predefined functions, which directly affect the performance of the extended state observer 520.

The nonlinear state error feedback control law 530 is used to nonlinearly combine the error signals $e_1$ and $e_2$. $e_1$ and $e_2$ are represented by Equation (3) below:

$$\begin{cases} e_1 = v_1 - z_1 \\ e_2 = v_2 - z_2 \end{cases} \quad (3)$$

wherein, $e_1$ represents the error between the tracking signal $v_1$ of the reference input signal $v_0$ and the observation $z_1$ of the actual output signal y(t), and $e_2$ represents the error between the differential signal $v_2$ of the reference input signal $v_0$ and the observation $z_2$ of the first-order differential $\dot{y}$ of the actual output signal. In some examples, the nonlinear state error feedback control law 530 performs a nonlinear combination of the error signals $e_1$ and $e_2$ to generate an error compensation variable that can be calculated using Equation (4):

$$u_0=\beta_1 fal(e_1,\alpha,\delta)-\beta_2 fal(e_2,\alpha,\delta) \quad (4)$$

wherein $u_0$ represents the error control variable, $\beta_1$ and $\beta_2$ are adjustable gain parameters, the function $fal(e, \alpha, \delta)$ is a predefined function, e refers to $e_1$ or $e_2$, and $\alpha$ and $\delta$ are parameters of $fal(e, \alpha, \delta)$. In some examples, the function $fal(e, \alpha, \delta)$ can be represented by Equation (5):

$$fal(e, \alpha, \delta) = \begin{cases} |e|^\alpha \text{sgn}(e), & |e| > \delta \\ \dfrac{e}{\delta^{1-\alpha}}, & |e| \le \delta \end{cases} \quad (5)$$

where the sign function sgn(e) is defined by Equation (6):

$$\operatorname{sgn}(e) = \begin{cases} 1, & e > 0 \\ 0, & e = 0 \\ -1, & e < 0 \end{cases} \quad (6)$$

By adjusting the adjustable gain parameters $\beta_1$ and $\beta_2$ and the parameters of the function $fal(e, \alpha, \delta)$, the nonlinear error feedback control law 530 can achieve the adjustment effect of "small error, large gain; while large error, small gain". Compared with the linear gain of the error signal performed by the traditional proportional-integral-derivative (PID) controller, better regulation effect can be obtained.

Then, the estimated value $z_3$ of the total disturbance is used to compensate the error control variable $u_0$ to generate the actual control variable u:

$$u = u_0 - \frac{z_3}{b} \quad (7)$$

When $z_3$ can accurately estimate the total disturbance (y, ẏ, t, w), $z_3 = f(y, ẏ, t, w)$, substituting Equation (7) into Equation (1) can obtain:

$$\ddot{y} = f(y, \dot{y}, t, w) + bu = z_3 + b\left(u_0 - \frac{z_3}{b}\right) = bu_0 \quad (8)$$

Combining with FIG. 5, it can be seen from Equation (8) that the open-loop transfer relationship from $u_0$ to the actual output signal y of the controlled object 540 is transformed into an integral series form from ÿ to y.

In the above-mentioned second-order active disturbance rejection controller 50, the extended state observer 520 is the core component. The active disturbance rejection controller only needs the actual control variable and output signal of the controlled object as source of information. Through the extended state observer 520, not only the estimation of each state variable can be obtained, but also the estimation of the total disturbance of the system can be estimated and compensated in the feedback, so as to achieve the purpose of adjusting the output of the controlled object 540. A large number of numerical and application simulation experiments show that when the functions $g_1$, $g_2$ and $g_3$, gain parameters $\beta_1$ and $\beta_2$ and other states in the active disturbance rejection controller are properly selected, the actual output signal y can well follow the reference input signal $v_0$, so the active disturbance rejection controller has good adaptability and strong robustness to various controlled objects.

It should be noted that in the example in FIG. 5, the second-order extended state observer is illustrated as an extended state observer as an example. However, the orthopedic surgical robotic system itself is a complex control object, and there are high-order disturbances to the locked working point provided by it. In some embodiments, if it is desired to achieve better active disturbance rejection control for the orthopedic surgical robotic system, then the corresponding high-order extended state observer should be selected in the active disturbance rejection controller. The larger the order of the extended state observer, the more parameters need to be tuned, which brings a lot of inconvenience to practical engineering applications. Moreover, the parameters of the extended state observer need to be selected as a large value in the case of high order, which will make the extended state observer output a differential signal with high frequency noise. Specifically, in a high-order nonlinear system, referring to Equation (2), the differentials of the estimated values $z_1$, $z_2$ and $z_3$ are adjusted by the error $(z_1 - y(t))$, such that they track their respective values to be estimated. For the extended state observer, the fast approximation of $z_1$ to y comes first, followed by the approximation of $z_2$ to ẏ, and finally the approximation of $z_3$ to the total disturbance. The disorder of this sequence will lead to the failure of system regulation. Of course, the system controls $z_1$, $z_2$ and $z_3$ at the same time. Under this regulation mechanism, before $z_1$ tracks y to reach a steady state, the control of $z_2$ tracking ẏ and the control of $z_3$ tracking the total disturbance have little meaning. After the tracking adjustment of $z_1$ to y is completed, the adjustment of $z_2$ and $z_3$ becomes difficult again, because the error $(z_1 - y)(t)$ at this time is already very small. In order to realize the adjustment of $z_2$ and $z_3$, some extended state observers can only be realized by selecting rather large parameters. For example, the parameters selected for $z_2$ are an order of magnitude larger than the parameters selected for $z_1$, and the parameters selected for $z_3$ are also an order of magnitude larger than the parameters selected for $z_2$. These excessively large parameters will reduce the dynamic performance of the extended state observer. Therefore, these high-order extended state observers limit the improvement of the followability of orthopedic surgical robotic systems.

Therefore, in some embodiments of the present application, the active disturbance rejection controller uses a linear extended state observer (Linear ESO) instead of a high-order state observer. Since the linear extended state observer all uses uniform parameters, this not only overcomes the high-order noise problem caused by the excessively large parameter value of the above-mentioned high-order extended state observer, but also reduces the number of parameters that need to be adjusted by the extended state observer, thereby reducing the difficulty of parameter tuning.

Figure 6:
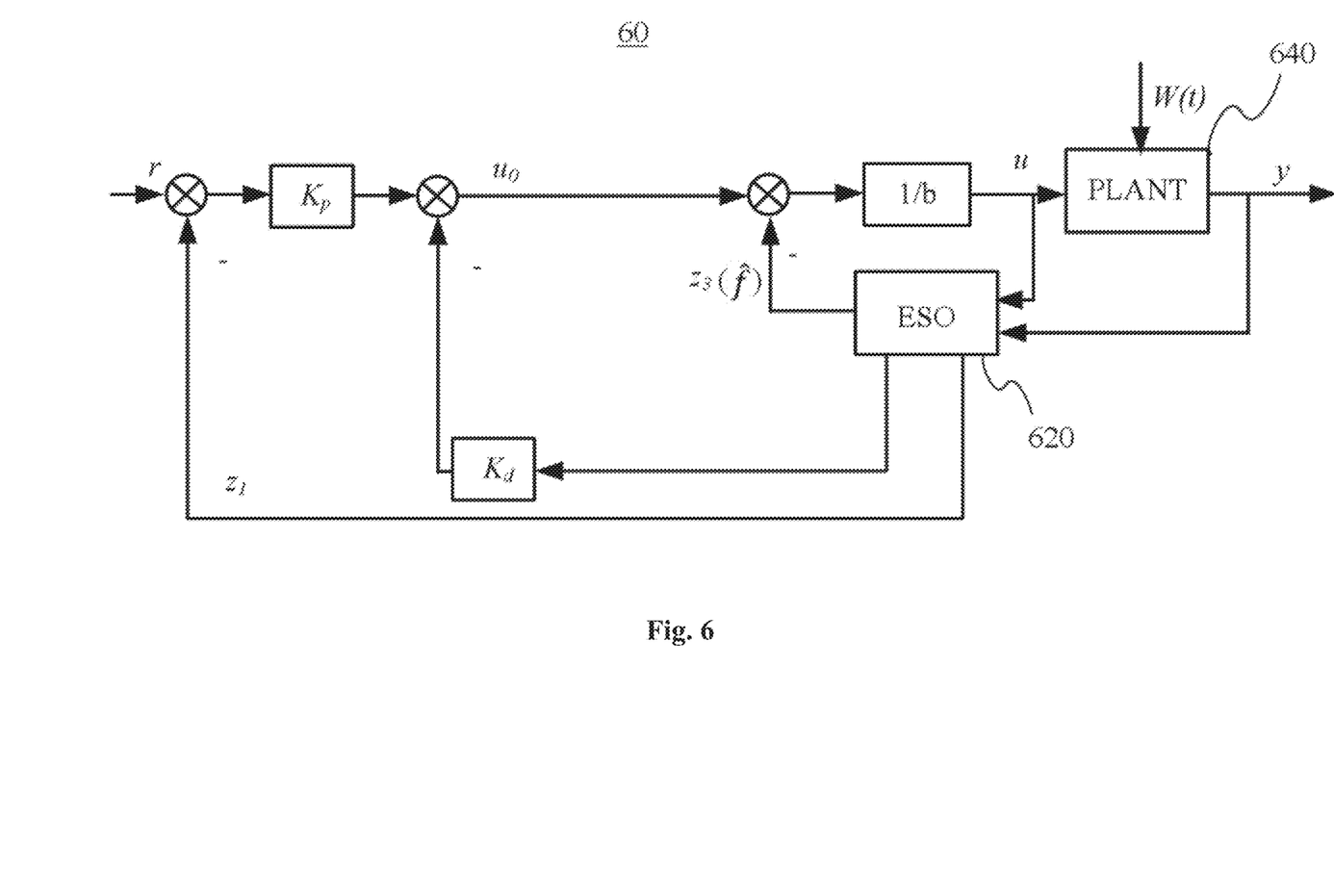
FIG. 6 illustrates a block diagram of an active disturbance rejection controller 60 according to some embodiments of the present application.

Referring to FIG. 6, a schematic structural diagram of an active disturbance rejection controller 60 is illustrated according to some embodiments of the present application. Symbols in FIG. 6 that are the same as those in FIG. 5 have the same meanings and will not be repeated here.

It is still assumed that the controlled object 640 is an uncertain second-order system with an unknown disturbance effect represented by Equation (1): $\ddot{y} = f(y, \dot{y}, t, w) + bu$. Considering that when the active disturbance rejection controller 60 is used in the orthopedic surgical robotic system of the present application, the distal end of the mechanical arm is used for the orthopedic surgical robotic system to provide a locked working point, that is, the position of the working point remains unchanged. When the position information of the locked working point is used as a reference input signal, its differential signal is 0. Therefore, the system in FIG. 6 does not include a differentiator, but directly uses the position information r of the expected working point as the reference input signal of the active disturbance rejection controller. Of course, in some examples, the active disturbance rejection controller 60 may also include the same tracking differentiator 510 as the active disturbance rejection controller 50, which uses the tracking signal generated based on the position information of the expected working point as r.

The linear extended state observer (Linear ESO) 620 observes the state variable of the controlled object 640 based on the actual control variable u(t) and the actual output variable y(t) of the controlled object 640, and generates the observation $z_1$ of the actual output signal y(t) of the controlled object 640, the observed value $z_2$ of the first-order differential $\dot{y}$, and the estimated value $z_3$ of the total disturbance.

In addition, the active disturbance rejection controller 60 shown in FIG. 6 also simplifies the nonlinear state error feedback control law. Compared with the nonlinear state error feedback control law in FIG. 5, it does not include the function $fal(e, \alpha, \delta)$, but only includes two gain parameters $k_p$ and $k_d$, which act on the error $(r-z_1)$ and the estimated value $z_2$ respectively. That is, the nonlinear state error feedback control law of the active disturbance rejection controller 60 can be expressed as:

$$u_0 = k_p(r-z_1) - k_d z_2 \qquad (9)$$

In FIG. 6, the actual control variable of the controlled object 640 is expressed as:

$$u = \frac{u_0 - z_3}{b} \qquad (10)$$

Substituting the actual control variable u in Equation (3) into Equation (1), the original system can be simplified to Equation (11):

$$\ddot{y} = f(y, \dot{y}, t, w) + u_0 - z_3 \qquad (11)$$

Since $z_3$ is the estimated value of the total disturbance of the system $f(y, \dot{y}, t, w)$, when $z_3$ can accurately estimate the total disturbance $f(y, \dot{y}, t, w)$:

$$z_3 = \hat{f} \approx f(y, \dot{y}, t, w) \qquad (12)$$

wherein $\hat{f}$ represents the estimated value of the total disturbance $f(y, \dot{y}, t, w)$.

Further, substituting formula (12) into formula (11) gives:

$$\ddot{y} = f(y, \dot{y}, t, w) - \hat{f} + u_0 \approx u_0 \qquad (13)$$

Thus, the open-loop transfer relationship from $u_0$ to the actual output signal y of the controlled object 640 is transformed into an integral series form from $\ddot{y}$ to y.

In the active disturbance rejection controller 60 of FIG. 6, since the linear extended state observer is used instead of the high-order extended state observer, the problem of high-frequency noise and difficult parameter setting in the high-order extended state observer can be overcome. However, in the above analysis, it is assumed that the total disturbance $f(y, \dot{y}, t, w)$ can be accurately estimated by $z_3$, but in fact, the total disturbance $f(y, \dot{y}, t, w)$ cannot be accurately estimated by using the linear expansion state observer, and there is an error.

Therefore, in the active disturbance rejection controller of some embodiments of the present application, two or more linear extended state observers are used instead of a high-order extended state observer to compensate error in the total disturbance estimation.

Figure 7:
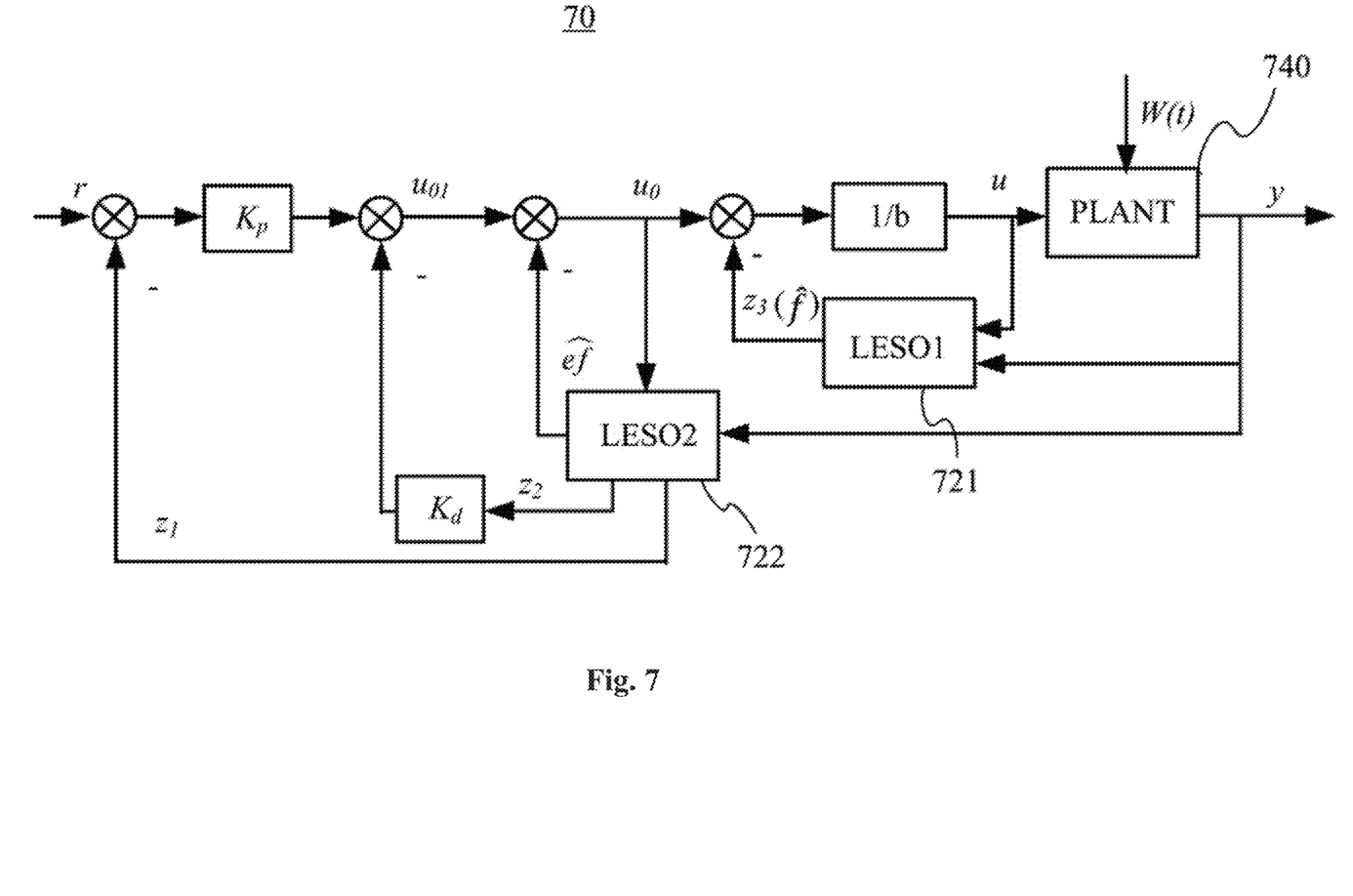
FIG. 7 illustrates a block diagram of an active disturbance rejection controller 70 according to some embodiments of the present application.

Referring to FIG. 7, a schematic structural diagram of an active disturbance rejection controller 70 is illustrated according to some embodiments of the present application. Symbols in FIG. 7 that are the same as those in FIG. 6 have the same meanings and will not be repeated here. Compared with the active disturbance rejection controller 60 shown in FIG. 6, the active disturbance rejection controller 70 includes two linear extended state observers 721 and 722, and adds the virtual control variable $u_{01}$.

It is still assumed that the controlled object 740 is an uncertain second-order system with an unknown disturbance effect represented by Equation (1): $\ddot{y} = f(y, \dot{y}, t, w) + bu$. The first linear extended state observer 721 observes the total disturbance $f(y, \dot{y}, t, w)$ based on the actual control variable u(t) and the actual output signal y(t) of the controlled object 740 to generate an estimated value $z_3$ (namely $\hat{f}$). As mentioned above, the first linear extended state observer 721 cannot accurately estimate the total disturbance $f(y, \dot{y}, t, w)$, and there is an error. Assume that the estimation error for the total disturbance is $ef$, defined by Equation (14) below:

$$ef = f(y, \dot{y}, t, w) - \hat{f} \qquad (14)$$

Substituting Equation (14) into Equation (13) gives:

$$\ddot{y} = f(y, \dot{y}, t, w) - \hat{f} + u_0 = ef + u_0 \qquad (15)$$

It can be understood from formula (15) that the solution to the second-order system is transformed into the solution to the estimation error $ef$ of the total disturbance, and the estimation error $ef$ of the total disturbance can be observed from the actual output signal y and the error control variable $u_0$ in the control process. Therefore, the active disturbance rejection controller 70 of FIG. 7 further includes a second linear extended state observer 722, which is used to observe the estimation error $ef$ of the total disturbance based on the actual output signal y and the error control variable $u_0$, and generate the observed value $\widehat{ef}$ of the estimation error $ef$ of the total disturbance. In addition, the second linear extended state observer 722 also outputs the observation $z_1$ of the actual output signal y of the controlled object 740 and the observation $z_2$ of the first-order differential $\dot{y}$ based on the actual output signal y and the error control variable $u_0$.

After adding the second linear extended state observer 722, a virtual control variable $u_{01}$ is generated, and can be expressed by the following Equation (16):

$$u_{01} = k_p(r-z_1) - k_d z_2 \qquad (16)$$

The relationship between the error control variable $u_0$ and the virtual control variable $u_{01}$ is expressed by Equation (17):

$$u_0 = -\widehat{ef} + u_{01} \qquad (17)$$

The relationship between the actual control variable u and the error control variable $u_0$ is expressed by Equation (18):

$$y = \frac{-\hat{f} + u_0}{b} \qquad (18)$$

Combining Equations (17) and (18), it can be understood that the actual control variable u can be obtained by adjusting $u_{01}$ by the $\widehat{ef}$ observed by the second linear extended state observer 722.

Next, substituting Equation (17) into Equation (15), and assuming that $\widehat{ef}$ observed by the second linear extended state observer 722 accurately estimates the estimation error $ef$ of the total disturbance, that is, $\widehat{ef} = ef$, then it can be obtained:

$$\ddot{y} = ef - ef + u_{01} = u_{01} \qquad (19)$$

Therefore, the open-loop transfer relationship of the active disturbance rejection controller 70 from the virtual control variable $u_{01}$ to the actual output signal y of the controlled object 740 is also transformed into an integral series form from $\ddot{y}$ to y.

It can be seen that by introducing the second linear extended state observer 722 into the active disturbance rejection controller 70, observing the estimation error $\widehat{ef}$ of the total disturbance and compensating for the observation, the function of the high-order extended state observer can be realized by two linear extended state observers, which overcomes the problem of high-frequency noise caused by excessively large parameter values when using the high-order extended state observer. In addition, because the parameters and rules of the linear extended state observer are simple, and the two linear extended state observers 721 and 722 can use uniform parameters, the difficulty of parameter adjustment for it is further reduced.

It should be noted that the active disturbance rejection controller in FIG. 7 uses two linear extended state observers to be equivalent to the high-order extended state observer to describe the active disturbance rejection controller structure of the embodiments of the present application. However, it can be understood that in other embodiments, according to specific application scenarios, more than two linear extended state observers may also be used to be equivalent to the higher-order extended state observer.

The active disturbance rejection controllers in the above-mentioned FIGS. 5-7 can all be applied to the orthopedic surgical robotic system of the present application, and the robotic arm is used as the controlled object 540, 640 or 740. The information of the expected position of the locked working point O of the distal end of the robotic arm serves as the reference input signal $v_0$ of the active disturbance rejection controllers 50 and 60, or the reference input signal r of the active disturbance rejection controller 70. The actual position information of the locked working point O of the distal end of the robotic arm is used as the actual output y, which can be obtained by detecting the actual position of the distal end of the robotic arm by the state monitoring subsystem 420 of the control system 40 of the orthopedic surgical robotic system. The actual input control variable a generated by the active disturbance rejection controller is transmitted to the motion control subsystem 410 as an regulation control variable, so that the motion control subsystem 410 can control the output torques of multiple motors coupled to multiple joints of the robotic arm based on the base control variable and the regulation control variable, thereby controlling the actual position of the remote working point O of the robotic arm to be locked at the expected position, reducing or eliminating the influence of internal disturbances or external load changes on the position of the distal end working point.

Figure 8:
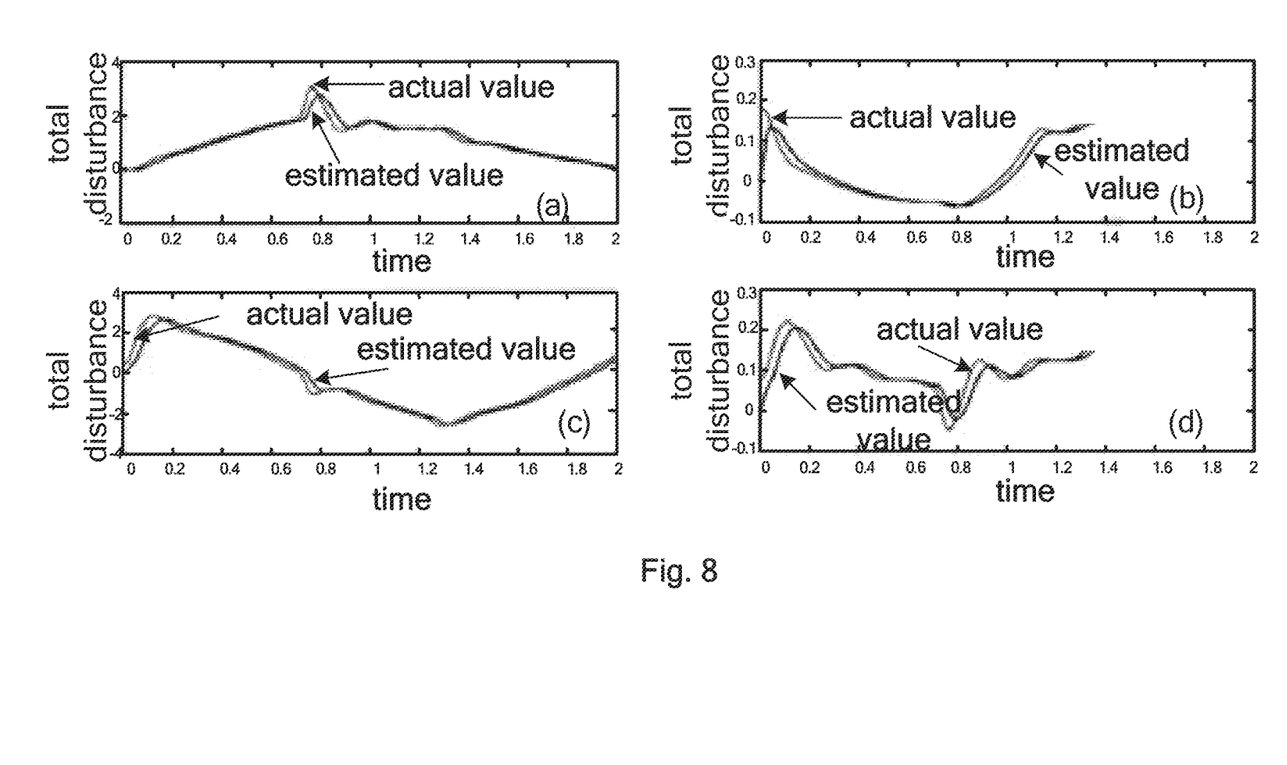
FIG. 8(a), FIG. 8(b), FIG. 8(c) and FIG. 8(d) illustrate comparison diagrams of actual disturbance value versus estimated disturbance value for the lumbar joint, elbow joint, shoulder joint and wrist joint of the robotic arm, respectively.

Referring to FIG. 8(*a*), FIG. 8(*b*), FIG. 8(*c*) and FIG. 8(*d*), they respectively show simulation comparison diagrams of the total disturbance value acting on the seat portion 110, the shoulder portion 120, the elbow portion 130 and the first wrist portion 140 and the disturbance estimation of respective joints obtained by using the active disturbance rejection controller 70 shown in FIG. 7. As shown in the figures, the estimated disturbance can well follow the actual total disturbance, so that the total disturbance at each joint can be compensated by the active disturbance rejection controller 70, and the distal end of the robotic arm 10 is stable at the locked working point O.

In addition, embodiments of the present application provide a method for controlling an aforementioned orthopedic surgical robotic system. The method includes: controlling the distal end of the robotic arm to be located at an expected working point position based on a reference input control variable; monitoring an actual working point position of the distal end of the robotic arm; generating an actual input control variable by adjusting the reference input control variable based on a difference between the expected working point position and the actual working point position of the distal end of the robotic arm; and controlling the distal end of the robotic arm to be located at the locked working point based on the actual input control variable. This method can be executed by a control system in the orthopedic surgical robotic system described in conjunction with FIG. 1, and its detailed introduction can refer to the description of the control system above and will not be repeated here.

In some embodiments, the method for controlling an orthopedic surgical robotic system may be implemented as one or more application specific integrated circuits (ASIC), digital signal processors (DSP), digital signal processing devices (DSPD), programmable logic devices (PLD), field programmable gate arrays (FPGA), controllers, micro-controllers, microprocessors or other electronic devices. Moreover, the apparatus described above are only illustrative, and the division of units is merely based on logic functions, and the division manner may be implemented in other ways in practice. For example, multiple units or components can be combined or integrated within another system, or some features can be ignored or can be non-executed. Also, the illustrated or discussed coupling or direct coupling or communicative coupling between each other can be implemented through some interfaces, and indirect coupling or communicative connection between devices or units can be electronic or in other manners. The units shown as discrete components may be or may not be separate physically, and the components shown as units may be or may not be physical units, i.e., they can be arranged in a single position or distributed to multiple network units. A portion or all of the units can be selected to implement the embodiments of the present application according to actual needs.

In some other embodiments, the control system of the orthopedic surgical robotic system may also be realized in the form of a software functional unit. When the functional units are implemented as software functional units and sold or used as separate products, they can be stored in a computer readable storage medium, and can be performed by a computing device. Based on such understanding, the technical solution or a contribution to the prior art of the present application or a part or all of the technical solution can be embodied in a software product which can be stored in a storage medium and include instructions executable by a computing device (e.g. a personal computer, a mobile terminal, a server or a network device, etc.) to perform a portion or all of the steps of the method according to the embodiments of the present application.

Embodiments of the present application also provide a non-transitory computer-readable storage medium, the non-transitory computer-readable storage medium stores a computer program, and when the computer program is executed by a processor, the method for variable speed osteotomy is performed. In some embodiments, the non-transitory computer-readable storage medium may be a flash memory, a read only memory (ROM), an electrically programmable ROM, an electrically erasable and programmable ROM, register, hard disk, removable disk, CD-ROM, or any other form of non-transitory computer-readable storage medium known in the art.

Other variations to the disclosed embodiments can be understood and implemented by those skilled in the art by studying the specification, drawings and accompanying drawing. In the claims, wording "comprise" does not exclude other elements and steps, and wordings "a" and "one" do not exclude plural. In the practical application of the present application, an element may perform the functions of a plurality of technical features cited in the claims. Any reference markers in the claims should not be construed as limiting the scope.

The invention claimed is:

1. An orthopedic surgical robotic system, comprising:
a robotic arm, wherein a distal end of the robotic arm is used for providing a locked working point for the orthopedic surgical robotic system;
a multi-link mechanism, wherein the multi-link mechanism comprises:
   a first link coupled to the distal end of the robotic arm; and
   a second link, wherein a proximal end of the second link is movably connected to the first link, such that a movement of the second link relative to the first link provides the orthopedic surgical robotic system with a locked working plane relative to the locked working point;
a bone saw, wherein the bone saw is coupled to a distal end of the second link and is capable of operating in the locked working plane; and
a control system, wherein the control system is coupled to the robotic arm and controls the distal end of the robotic arm to stabilize at the locked working point based on a base control variable of the robotic arm and an actual working point position of the distal end of the robotic arm,
wherein the control system comprises:
   a motion control subsystem configured for controlling the distal end of the robotic arm to be located at an expected working point position based on the base control variable;
   a state monitoring subsystem configured for monitoring the actual working point position of the distal end of the robotic arm; and
   a state regulation subsystem configured for generating a regulation control variable based on a difference between the expected working point position and the actual working point position of the distal end of the robotic arm, such that the motion control subsystem is capable of controlling the distal end of the robotic arm to stabilize at the expected working point position based on the base control variable and the regulation control variable, and the expected working point serves as the locked working point,
   wherein the state regulation subsystem comprises an active disturbance rejection controller comprising an extended state observer module, wherein the extended state observer module is used for generating an estimate of a total disturbance of the orthopedic surgical robotic system, and the active disturbance rejection controller generates the regulation control variable based on the estimate of the total disturbance; and
   wherein the extended state observer module comprises a first linear extended state observer and a second linear extended state observer, wherein the first linear extended state observer is used for generating an estimate of the total disturbance, the second linear extended state observer is used for generating an error of the estimate of the total disturbance, and the active disturbance rejection generates the regulation control variable based on the estimate of the total disturbance and the error of the estimate of the total disturbance.

2. The system according to claim 1, wherein the multi-link mechanism is a right-angle slide two-link mechanism or a planar slide two-link mechanism.

3. The system according to claim 1, wherein the robotic arm comprises a plurality of joints, and the state monitoring subsystem determines the actual working point position of the distal end of the robotic arm by collecting a position information of each joint.

4. The system according to claim 3, wherein the robotic arm further comprises a plurality of motors corresponding to the plurality of joints, respectively and providing output torques to the plurality of joints, and wherein the motion control subsystem controls the output torques of the plurality of motors to control the distal end of the robotic arm to be located at the locked working point based on the actual input control variable.

5. The system according to claim 1, wherein the total disturbance of the orthopedic surgical robotic system comprises an external disturbance generated during the bone saw operation and an internal disturbance of the robotic arm.

6. The system according to claim 1, wherein the second linear extended state observer is further used for generating an observation signal of the actual working point position and an observation signal of a differential of the actual working point position;
wherein the extended state observer further comprises a nonlinear state error feedback control law, wherein the nonlinear state error feedback control law generates a virtual control variable based on the observation signal of the actual working point position, the observation signal of the differential of the actual working point position, and the expected working point position; and
the active disturbance rejection controller generates the regulation control variable based on the virtual control variable, the estimate of the total disturbance, and the error of the estimate of the total disturbance.

7. The system according to claim 1, wherein the extended state observer module is further used for generating an observation signal of the actual working point position and an observation signal of a differential of the actual working point position,
wherein the extended state observer further comprises:
a tracking differentiator used configured for receiving the expected working point position of the distal end of the robotic arm and generating a tracking signal and a differentiation signal of the expected working point position; and
a nonlinear state error feedback control law configured for generating an error control variable based on the observation signal of the actual working point position, the observation signal of the differential of the actual working point position, the tracking signal of the expected working point position, and the differential signal of the expected working point position, and
the active disturbance rejection controller is configured for generating the regulation control variable based on the error control variable and the estimate of the total disturbance.

8. A method for controlling an orthopedic surgical robotic system of claim 1, comprising:
controlling the distal end of the robotic arm to be located at an expected working point position based on a base control variable;
monitoring an actual working point position of the distal end of the robotic arm;

generating a regulation control variable based on a difference between the expected working point position and the actual working point position of the distal end of the robotic arm; and controlling the distal end of the robotic arm to stabilize at the expected working point position based on the base control variable and the regulation control variable.

* * * * *